United States Patent [19]

Kobayashi et al.

[11] Patent Number: 4,756,231
[45] Date of Patent: Jul. 12, 1988

[54] PNEUMATIC BRAKE BOOSTER

[75] Inventors: Michio Kobayashi, Saitama; Jun Kubo, Tokyo; Norio Fujiki, Yokohama, all of Japan

[73] Assignees: Nissan Motor Co., Ltd.; Jidosha Kiki Co., Ltd., both of Japan

[21] Appl. No.: 894,040

[22] Filed: Aug. 7, 1986

[30] Foreign Application Priority Data

Aug. 13, 1985 [JP] Japan .................. 60-177991

[51] Int. Cl.⁴ .......................................... F15B 13/04
[52] U.S. Cl. .................................. 91/369 A; 91/390; 91/391 R
[58] Field of Search ........... 60/553; 91/369 R, 369 A, 91/376 R, 377, 388, 390, 391 R

[56] References Cited

U.S. PATENT DOCUMENTS

| | | | |
|---|---|---|---|
| 3,831,489 | 8/1974 | Woo | 91/32 |
| 4,287,811 | 9/1981 | Katagiri et al. | 91/369 A |
| 4,318,272 | 3/1982 | Leiber et al. | 60/554 |
| 4,399,735 | 8/1983 | Katagiri et al. | 91/369 A |
| 4,493,243 | 1/1985 | Horibe | 91/376 R |
| 4,633,757 | 1/1987 | Kubota | 91/369 A |
| 4,640,097 | 2/1987 | Kobayashi | 60/554 |
| 4,664,016 | 5/1987 | Tobisawa et al. | 91/369 A |

FOREIGN PATENT DOCUMENTS

| | | | |
|---|---|---|---|
| 0136690 | 4/1985 | European Pat. Off. | 91/376 R |
| 0140187 | 5/1985 | European Pat. Off. | |
| 2360276 | 6/1975 | Fed. Rep. of Germany . | |
| 3342552 | 6/1985 | Fed. Rep. of Germany . | |
| 58-188746 | 11/1983 | Japan . | |

*Primary Examiner*—George L. Walton
*Attorney, Agent, or Firm*—Leydig, Voit & Mayer

[57] ABSTRACT

An input pressure detecting device is arranged in an input side of a pneumatic brake booster, which comprises an elastic member having a given portion which expands when a pressure is applied to the elastic member, a pressure sensor for issuing, upon receiving a pressure, a signal representative of the intensity of the pressure applied thereto, and an axially movable piston intimately disposed between the given portion of the elastic member and the pressure sensor. Upon application of force to the elastic member due to depression of the brake pedal, the elastic member is compressed causing the given portion to expand and thus applying a corresponding but small pressure to the pressure sensor through the piston.

21 Claims, 2 Drawing Sheets

PNEUMATIC BRAKE BOOSTER

BACKGROUND OF THE INVENTION

1. Field of the Invention

The present invention relates in general to a brake booster which permits the driver to easily brake the vehicle by exerting only a little pressure on the brake pedal, and more particularly to a pneumatic brake booster which is equipped with a pressure control means by which the pressure supplied to the work chamber of the booster is suitably controlled in accordance with a force practically applied to the brake pedal by the driver. More specifically, the present invention is concerned with a pneumatic brake booster which holds therein a pressure sensor for detecting the force practically applied to an input rod of the booster from the brake pedal.

2. Description of a Prior Art

Hitherto, various kinds of brake boosters have been proposed and put into practical use in a field of automotive brakes. Some of them are of a pneumatic type using a pressurized air as medium for actuating a power piston in the booster. Japanese Patent First Provisional Publication No. 58-188746 proposes to incorporate the boosters of such type with an electronic pressure control means by which the pressure applied to the work chamber of the booster is electronically controlled in accordance with a force practically applied to the brake pedal by the driver. In this regard, the Publication discloses a brake booster equipped with a pressure sensor which detects the brake pedal force practically applied to an input rod of the booster from the brake pedal. Since the output characteristic of the booster can be easily changed by only adjusting the control means, such boosters are widely applicable to various types of motor vehicle. However, due to their inherent constructions, it sometimes occurs that a great pressure above 900 Kg is directly applied to the pressure sensor proper during braking of the vehicle, particularly, upon sudden braking. Thus, the pressure sensors used in such boosters must have steady and strong constructions in order to avoid breakage thereof. However, as is known, such construction brings about increased cost of productions.

SUMMARY OF THE INVENTION

It is therefore an object of the present invention to provide a pneumatic brake booster equipped with a pressure sensor which is arranged to receive only a small pressure even when a great force is applied to an input rod of the booster from the brake pedal.

According to the present invention, there is provided a pneumatic brake booster which is equipped with an improved pressure sensor supporting arrangement by which only a small but corresponding degree of pressure is applied to the pressure sensor when a force is applied to the input rod of the booster from the brake pedal.

According to the present invention, there is provided, in a pneumatic power brake system having an electronic pressure control device and a pressurized air source, a brake booster which comprises a housing the interior of which is divided into first and second chambers by a diaphragm member, the first chamber being communicated with the atmosphere and the second chamber being communicated with the pressurized air source via the electronic control device, a power piston attached to the diaphragm member to move therewith, an input means connected to the power piston and receiving a force generated by an external driving member, an output means connected to the power piston and transmitting a power from the power piston to an external driven member, and an input pressure detecting device incorporated with the input means and including first means which converts a force applied to the input means into a corresponding pressure and second means which applies the electronic pressure control device with an information signal representative of the intensity of the pressure.

DETAILED DESCRIPTION OF THE INVENTION

Figure 1:
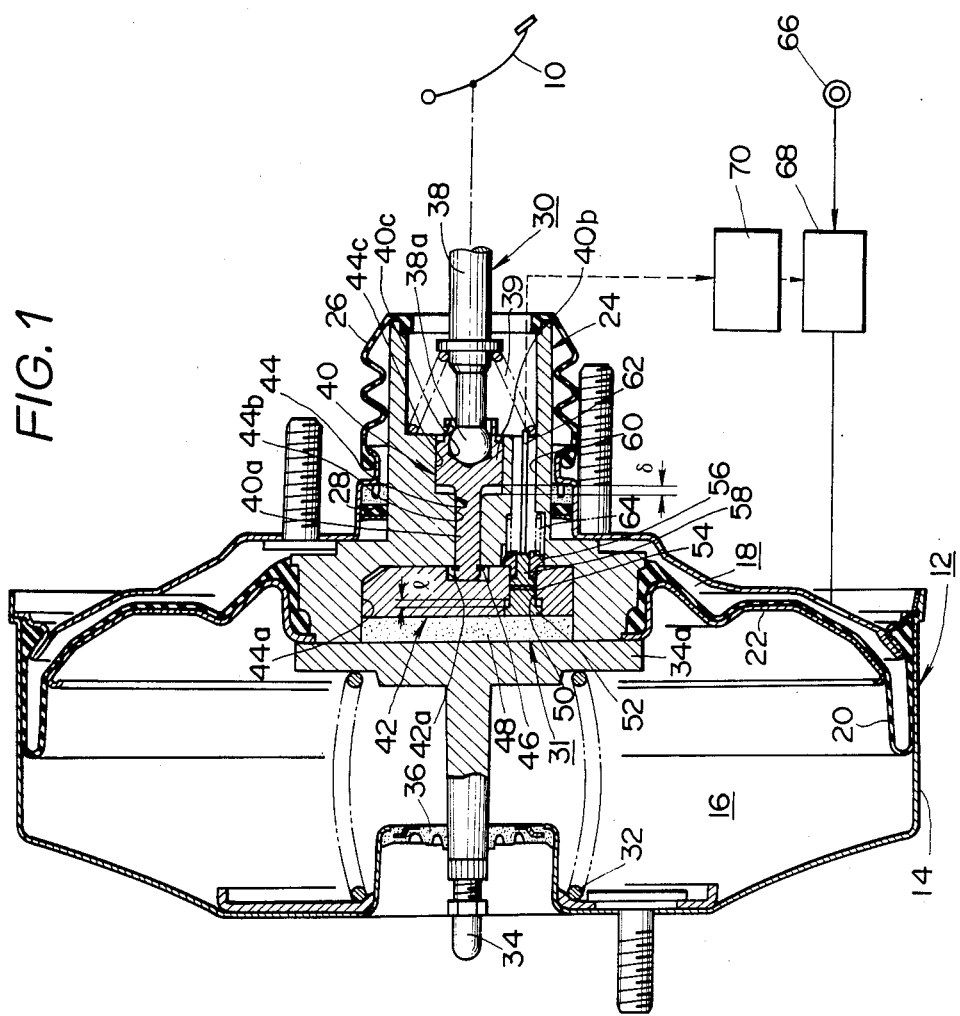
FIG. 1 is a sectional view of a pneumatic type brake booster of a first embodiment of the present invention.

Referring to FIG. 1, there is shown a first embodiment of the present invention. In this drawing, denoted by numeral 10 is a brake pedal which is pivotally connected to a vehicle body (not shown) in a known manner.

Denoted by numeral 12 is a pneumatic type brake booster which can output a multiplied brake power in accordance with a brake pedal force applied to an input means of the booster 12. The brake booster 12 comprises a sealed housing 14 the interior of which is divided into first and second chambers 16 and 18 by a diaphragm 20. The first chamber 16 is constantly communicated with the atmosphere through on opening formed in the housing 14. While, the second chamber 18 is selectively communicated with either the atmosphere or a pressure source by the function of an after described pressure control device 68. The diaphragm 20 carries thereon a power piston 22 to move therewith axially in the housing 14.

To a central apertured portion of the power piston 22, there is connected one axial end of a generally cylindrical body 24 which is thus movable axially with the power piston 22. The cylindrical body 24 is put in a bellows 26 which has one end secured to an outward axial end of the cylindrical body 24 and the other end secured to a restricted end of the housing 14. An annular sealing member 28 is disposed between the tubular body 24 and the restricted end of the housing 14 in order to isolate the second chamber 18 from the atmosphere. The cylindrical body 24 is linked to the brake pedal 10 through an input means 30 which will be described in detail hereinafter.

Within the cylindrical body 24, there is arranged an input pressure detecting device 31 which will be described hereinafter. Due to function of a return spring 32 disposed in the first chamber 16 of the housing 14, the power piston 22 and thus the diaphragm 22 are biased rightward in the drawing to assume the illustrated rest positions. An output rod 34 is secured at its enlarged base portion 34a to the power piston 22 and extends coaxially outwardly from the housing 14 through a seal member 36. Although not shown in the drawing, the output rod 34 is connected to a piston of a brake master cylinder.

The input means 30 comprises generally an input rod 38 coaxially arranged in the cylindrical body 24 and linked to the brake pedal 10, a stepped plunger 40 consisting of a smaller diameter portion 40a and a larger diameter portion 40b, and a push plate 42 which are coaxially arranged in this order. The plunger 40 is slidably received in a stepped bore 44 formed in the cylindrical body 24. As is seen from the drawing, the stepped bore 44 consists of a larger diameter portion 44a for receiving the push plate 42, a smaller diameter portion 44b for receiving the smaller diameter portion 40a of the plunger 40 and a medium diameter portion 44c for receiving the larger diameter portion 40b of the plunger 40. The larger diameter portion 40b is formed with a bore 40c into which a spherical portion 38a of the input rod 38 is put to establish an articulated connection therebetween. A helical spring 39 is disposed between the cylindrical body 24 and the input rod 38 to bias the plunger 40 to assume its rightmost position. The smaller diameter portion 40a of the plunger 40 is partially projected into the larger diameter portion 44a of the stepped bore 44. For allowing this, the push plate 42 is formed with a central recess 42a into which the smaller diameter portion 40a of the plunger 40 is projected. A snap ring 46 is fixed to the projected portion to prevent the same from slipping into the the bore 44. It is to be noted that under the illustrated condition wherein the snap ring 46 is in contact with the step defined between the larger and smaller diameter portions 44a and 44b of the bore 44, there is provided a predetermined clearance '$\delta$' between the bottom of the medium diameter portion 44c of the bore 44 and the shoulder portion of the larger diameter portion 40b of the plunger 40. That is, the valve plunger 40 is slidable in the bore 44 by a distance of '$\delta$'. It is further to be noted that the depth of the afore-mentioned recess 42a of the push plate 42 is so sized that when the push plate 42 and the plunger 40 assumes their rightmost positions as shown in the drawing, the projected end of the plunger 40 contacts exactly the bottom of the recess 42a.

The input pressure detecting device 31 comprises an elastic member 48 neatly received in the larger diameter portion 44a of the stepped bore 44 between the push plate 42 and the enlarged base portion 34a of the output rod 34. The push plate 42 is formed with a stepped bore 50 which consists of a larger diameter portion (no numeral) facing the elastic member 48 and a smaller diameter portion (no numeral) facing the bottom of the larger diameter portion 44a of the bore 44. The elastic member 48 is constructed of an elastic rubber or the like. A small piston 52 of hard material is slidably received in the stepped bore 50, which comprises a larger diameter portion (no numeral) and a smaller diameter portion (no numeral). These portions are respectively received in the larger and smaller diameter portions of the stepped bore 50, as shown in the drawing. It is to be noted that under the illustrated rest condition wherein the piston 52 contacts the elastic member 48, there is provided a predetermined clearance '$\lambda$' between the bottom of the larger diameter portion of the stepped bore 50 and the shoulder portion of the larger diameter portion of the piston 52. That is, the piston 52 is slidable in the bore 50 by a distance of '$\lambda$'. A thin seat 54 of rubber material, Teflon (trade name) or the like, is bonded to the head of the smaller diameter portion of the piston 52 for the purpose which will be described hereinafter.

A sensor holder 56 holding a pressure sensor 58 is slidably received in the smaller diameter portion of the stepped bore 50 with its enlarged portion (no numeral) projected from the bore 50. For receiving the enlarged portion of the holder 56, a passage 60 is formed in the cylindrical body 24, through which lead wires 62 from the pressure sensor 58 extend to the outside of the booster 12. A coil spring 64 is disposed in the passage 60 to bias the pressure sensor holder 56 toward the piston 52 thereby to intimately contact the pressure sensor 58 with the piston 52. Because of the provision of the thin seat 54 on the piston 52, an after-mentioned pressure transmittance from the piston 52 to the pressure sensor 58 is effectively and evenly made. It is to be noted that under the illustrated condition wherein the pressure sensor 58 (viz., the holder 56) assumes its leftmost position, pressure applied from the piston 52 to the pressure sensor 58 is substantially zero.

The first chamber 16 is constantly communicated with the atmosphere, while, the second chamber 18 is selectively communicated with either the atmosphere or a pressurized air source 66 through a pressure control device 68. The pressure control device 68 is controlled by a micro-computer 70 to which information signals from the pressure sensor 58 are applied. That is, when no pressure is applied from the piston 52 to the pressure sensor 58, the computer 70 issues an instruction signal to the pressure control device 68 to communicate the second chamber 18 of the booster 12 with the atmosphere. Furthermore, when any pressure is applied to the pressure sensor 58, the computer 70 controls the pressure control device 68 so that pressurized air is supplied from the air source 66 to the second chamber 18 in accordance with the degree of the pressure applied to the pressure sensor 58.

Operation of the brake booster 12 of the first embodiment will be described in the following.

For ease with which explanation is made, it will be commenced with respect to the illustrated inoperative condition wherein the input rod 38 of the brake booster 12 is applied with no brake pedal force from the brake pedal 10.

Under this inoperative condition, no pressure is applied to the pressure sensor 58, so that, due to work of the computer 70, the second chamber 18 of the booster 12 is communicated with the atmosphere. Thus, the power piston 22 is kept in the illustrated rightmost rest position due to the function of the return spring 22.

Figure 2:
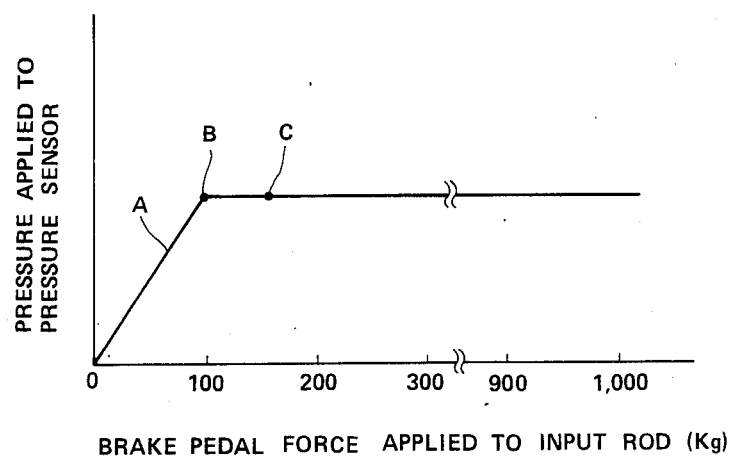
FIG. 2 is a graph showing a relationship between a brake pedal force applied to an input rod of the booster and a pressure applied to a pressure sensor installed in the booster.

When, due to depression of the brake pedal 10, a certain brake pedal force is applied to the input means 30, the input rod 38 pushes the valve plunger 40 and thus the push plate 42 is moved leftward in the drawing pressing the elastic member 48 against the enlarged base portion 34a of the output rod 34. During this, at least a portion of the elastic member 48 which is exposed to the piston bore 50 is expanded thereby moving the piston 52 rightward in the bore 50 applying a corresponding pressure to the pressure sensor 58. This phenomenon will be understood from the straight line of "A" of the graph of FIG. 2 which shows a relationship between the brake pedal force applied to the input rod 38 of the booster 14 and a pressure applied to the pressure sensor 58. It is to be noted that the pressure practically applied to the pressure sensor 58 is quite small as compared with the brake pedal force. This is because the pressure receiving area of the pressure sensor 58 is quite small as compared with that of the elastic member 48.

Upon receiving the information signals from the pressure sensor 58, the computer 70 controls the pressure control device 68 so as to supply the second chamber 18 with the pressurized air in accordance with the magnitude of the force applied to the input rod 38 by the driver. With this air supply, the power piston 22 and thus the output rod 34 are moved leftward pushing a piston (not shown) of an associated brake master cylinder with a multiplied brake pressure.

When the brake pedal force increases and exceeds a predetermined value (see the point "B" in the graph of FIG. 2), for example, about 100 kg (which is considered as a maximum brake pedal force applied to the input rod 38 during normal braking operation), the pressure sensor 58 is moved rightward together with the holder 56 against the biasing force of the spring 64. Thus, thereafter, the pressure applied to the pressure sensor 58 is kept constant, as is seen from the straight line "C" of FIG. 2.

When the brake pedal force further increases and exceeds overly the predetermined value, the piston 52 comes to its rightmost position with its larger diameter portion contacting with the step of the bore 50. Thus, thereafter, excessive expansion of the elastic member 48 at the portion exposed to the bore 50 is suppressed.

When, like in a breakage of brake fluid piping, the brake pedal 10 is applied with a great force from the driver, the valve plunger 40 instantly comes to its leftmost position with its larger diameter portion 40C contacting with the step of the associated bore 44. Thus, thereafter, the brake pedal force is directly applied to the cylindrical body 24 and thus to the output rod 34.

As is described hereinabove, the pressure sensor 58 is arranged to move back against the spring 64 when a large brake pedal force is applied to the input rod 38 of booster 14. Thus, the pressure sensor 58 is prevented from receiving unbrearably high pressure. Thus, in the invention, pressure sensors of a type having a high sensitivity in a limited sensing range can be used without worrying about mechanical strength thereof. This is very advantageous.

Figure 3:
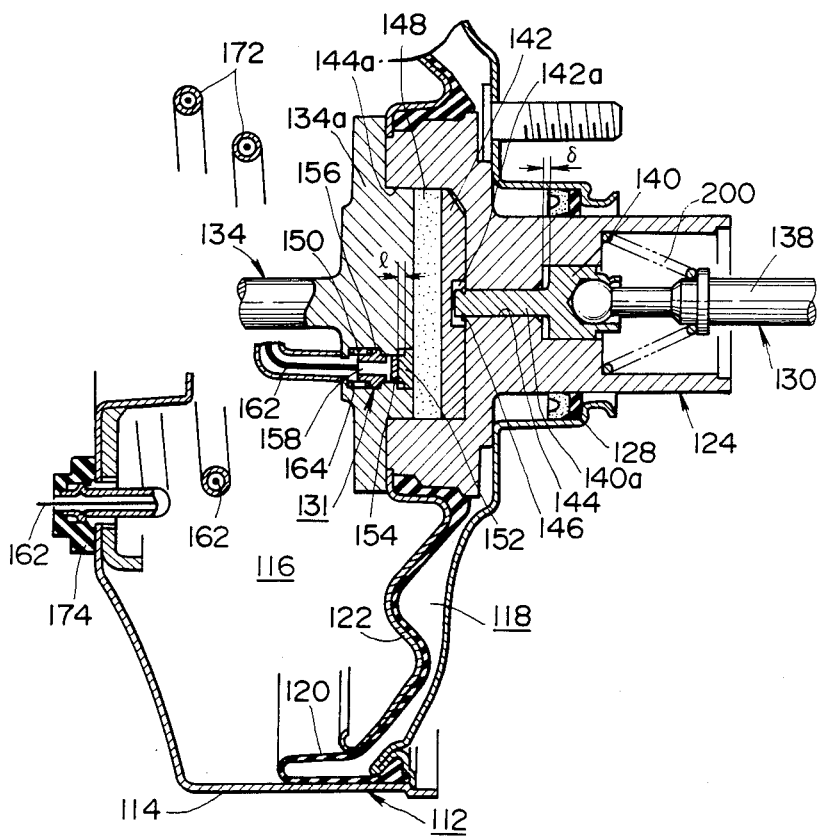
FIG. 3 is a partial sectional view of a second embodiment of the present invention.

Referring to FIG. 3, there is shown a second embodiment of the present invention. The brake booster 112 of this second embodiment comprises generally a sealed housing 114 which is divided into first and second chambers 116 and 118 by a diaphragm 120. A power piston 122 is attached to the diaphragm 120 to move therewith. A cylindrical body 124 is connected at its larger diameter portion to the central apertured portion of the power piston 122. An annular sealing member 128 is disposed between the tubular body 124 and a restricted end of the housing 114. Although not shown in the drawing, a return spring is disposed in the first chamber 116 to bias the power piston 122 toward the second chamber 118. An output rod 134 is secured at its enlarged base portion to the power piston 122, like in the case of the first embodiment.

An input means 130 of this second embodiment comprises an input rod 138 coaxially arranged in the cylindrical body 124 and linked to the brake pedal (not shown). A stepped plunger 140 is axially slidably received in a stepped bore 144 formed in the cylindrical body 124, like in the case of the first embodiment. A push plate 142 is axially slidably received in the larger diameter portion 144a of the stepped bore 144, which is formed with a central recess 142a into which the smaller diameter portion 140a of the plunger 140 is projected. The projected portion is equipped with a snap ring 146. The connection between the input rod 138 and the plunger 140 is made through an articulated connection, like in the case of the first embodiment. A helical spring 200 is disposed between the cylindrical body 124 and the input rod 138 so as to bias the plunger 140 to assume its rightmost position relative to the stepped bore 144 of the cylindrical body 124.

An input pressure detecting device 131 comprises an elastic member 148 neatly received in the larger diameter portion 144a of the bore 144 of the cylindrical body 124 at a position between the push plate 142 and the enlarged base portion 134a of the output rod 134. The enlarged base portion 134a has a round stage (no numeral) neatly received in the larger diameter portion 144a of the bore 144. The enlarged base portion 134a is formed with a stepped bore 150 which consists of first and second larger diameter portions and a smaller diameter portion which is arranged between the first and second larger diameter portions. The first larger diameter portion is exposed to the greater diameter portion of the bore 144 of the cylindrical body 124.

A small piston 152 is axially slidably received in the bore 150 having its larger and smaller diameter portions received in the first larger diameter portion of the bore 150 and the smaller diameter portion of the same, respectively. Similar to the case of the first embodiment, in the illustrated rest condition, there is provided a certain clearance 'λ' between the bottom of the first larger diameter portion of the bore 150 and the shoulder portion of the larger diameter portion of the piston 152, so that the piston 152 is slidable in the bore 150 leftward by the distance of 'λ' as viewed in FIG. 3. A thin seat 154 is attached to the end of the smaller diameter portion of the piston 152 for the same purpose as mentioned in the first embodiment.

A sensor holder 156 holding a pressure sensor 158 is slidably received in the second larger diameter portion of the bore 150. A coil spring 164 is disposed in the bore 150 to bias the pressure sensor holder 156 (and thus the pressure sensor 158) toward the piston 152. It is to be noted that under the illustrated rest condition wherein the pressure sensor 158 (viz., the holder 156) assumes its rightmost position, pressure applied from the piston 152 to the sensor 158 is substantially zero. Lead wires 162 from the sensor 158 extend through a flexible spiral tube 172 disposed in the first chamber 116 of the housing 14, and are projected to the outside of the housing 14 through a connector 174 secured to the housing 14, as shown.

The operation of the brake booster 112 of the second embodiment is substantially the same as that of the first embodiment. Thus, explanation of the operation will be omitted.

The following modifications are employable in the invention.

That is, first modification is that the pressure sensor 58 or 158 is fixedly disposed in the bore 50 or 150 with removal of the spring 64 or 164. In this case, the length 'λ' is so determined that the pressure applied to the pressure sensor 58 or 158 is saturated to a predetermined value (which corresponds to the value of 'B' in the graph of FIG. 2) when the brake pedal force applied to the input rod 38 of the booster 12 or 112 increases to about 100 Kg. Second modification is that the piston 52 or 152 is removed and the pressure sensor 58 or 158 is placed near the elastic member 48 or 148 to be directly contactable with the same. Third modification is that the pressure sensor 58 or 158 is directly connected to the push plate 42 or 142 with its detector proper portion pressed against the elastic member 48 or 148. Of course, the pressure sensor used in this third modification is of a type having a sensitivity over a wide sensing range and the length of 'δ' is so determined that the pressure applied to the pressure sensor becomes saturated to a predetermined value when the brake pedal force applied to the input rod of the booster 12 or 112 increases to about 100 Kg.

What is claimed is:

1. In a power brake system having an electronic pressure control device and an air source,
a brake booster comprising:
a housing the interior of which is divided into first and second chambers by a diaphragm member, one of said chambers being a fixed pressure chamber and one of said chambers being a variable pressure chamber the pressure of which is controlled by said electronic control device to apply a differential pressure to said diaphragm to move said diaphragm;
a power piston attached to said diaphragm member to move therewith;
an input means connected to said power piston and receiving a force generated by an external driving member;
an output means connected to said power piston and transmitting a power from said power piston to an external driven member; and
said input means including an input pressure detecting device having a first means which converts a force applied to said input means and produces a corresponding pressure having an intensity and a second means which directly receives the intensity of the pressure produced by said first means and generates an information signal representative of the intensity of the pressure received from said first means and applied the signal to said electronic pressure control device for controlling the pressure in said variable pressure chamber and the differential pressure applied to said diaphragm to operate said brake booster.

2. In a power brake system having an electronic pressure control device and an air source,
a brake booster comprising:
a housing the interior of which is divided into first and second chambers by a diaphragm member, one of said chambers being a fixed pressure chamber and one of said chambers being a variable pressure chamber the pressure of which is controlled by said electronic control device to apply a differential pressure to said diaphragm to move said diaphragm;
a power piston atached to said diaphragm member to move therewith;
an input means connected to said power piston and receiving a force generated by an external driving member;
an output means connected to said power piston and transmitting a power from said power piston to an external driven member; and
said input means including an input pressure detecting device having a first means comprising an elastic member which is intimately held in a space defined in said input means, said space being contractible upon receiving, from said input means, a force greater than a predetermined degree, and which converts a force applied to said input means and produces a corresponding pressure having an intensity, and a second means which is also disposed within a space defined in said first means and directly receives the intensity of the pressure produced by said first means and generates an information signal representative of the intensity of pressure received form said first means and applies the signal to said electronic pressure control device for controlling the pressure in said variable pressure chamber and the differential pressure applied to said diaphragm to operate said brake booster.

3. A brake booster as claimed in claim 2, in which said elastic member of the first means has a given limited portion which associates with said second means to transmit a dynamical change of said given portion to said second means.

4. A brake booster as claimed in claim 3, in which said second means comprises a pressure sensor.

5. A brake booster as claimed in claim 4, further comprising a piston member which is intimately interposed between said given portion of said elastic member and said pressure sensor to effectively achieve the transmission of the dynamical change from said given portion of the elastic member to said pressure sensor.

6. A brake booster as claimed in claim 5, further comprising a protector means which protects said pressure sensor from receiving a pressure higher than a predetermined degree.

7. A brake booster as claimed in claim 6, in which said protector means comprises a spring which supports said pressure sensor in such a manner that upon receiving an abnormally high pressure from said given portion of the elastic member, said pressure sensor is moved away from said given portion against the biasing force of said spring.

8. A brake booster as claimed in claim 7, further comprising a stopper means (λ) which positively stops the transmission of said dynamical change from said given portion of said elastic member to said pressure sensor when said dynamical change of said given portion exceeds a predetermined level.

9. A brake booster as claimed in claim 8, further comprising a force transmitting means which directly transmits the force of said external driving member to said power piston when said force exceeds a predetermined degree.

10. A brake booster as claimed in claim 2, in which said input means comprises:
a cylindrical body having an inboard end connected to said power piston and an outboard end exposed to the outside of said housing, said cylindrical body having therethrough an axially extending bore which includes coaxially arranged first and second bore sections, said first bore section being formed in said inboard end of the body and said second bore section being positioned near said outboard end of the body;
a plunger axially slidably received in said second bore section with an inboard portion thereof projected into said first bore section, the outboard end of said plunger being adapted to link with the external power source;
a push plate axially slidably received in said first bore section and engageable with said inboard portion of said plunger;
a cover structure attached to said inboard end of said body to cover said first bore section thereby to define an enclosed space between said push plate and said cover structure, said enclosed space receiving therein said elastic member of said input pressure detecting device.

11. A brake booster as claimed in claim 10, in which said plunger is formed with a stepped portion which is contactable with a stepped portion formed in said second bore section of the cylindrical body thereby to limit the movement of said plunger toward said push plate relative to said cylindrical body.

12. A brake booster as claimed in claim 11, in which said push plate is formed with a recess into which said inboard portion of said plunger is projected.

13. A brake booster as claimed in claim 12, in which said inboard portion of said plunger is equipped with a snap ring to prevent disengagement of said plunger from said second bore section.

14. A brake booster as claimed in claim 13, in which said push plate is formed with a through bore in which said pressure sensor and said piston of the input pressure detecting device are coaxially disposed.

15. A brake booster as claimed in claim 14, in which said pressure sensor is held by a holder which is axially movably held by said through bore of said push plate, and in which said holder is biased by a spring toward said piston thereby to establish an intimate contact between the piston and the pressure sensor.

16. A brake booster as claimed in claim 15, in which said cylindrical body is formed with a passage through which lead wires from said pressure sensor extend to the outside of the housing.

17. A brake booster as claimed in claim 16, in which said spring for biasing the pressure sensor holder is disposed in the passage of said cylindrical body.

18. A brake booster as claimed in claim 13, in which said cover structure is formed with a through bore in which said pressure sensor and said piston of the input pressure detecting device are coaxially disposed.

19. A brake booster as claimed in claim 18, in which said pressure sensor is held by a holder which is axially movably received in said through bore of said cover structure, and in which said holder is biased by a spring toward said piston thereby to establish an intimate contact between the piston and the pressure sensor.

20. A brake booster as claimed in claim 19, in which said spring is disposed in said through bore of said cover structure.

21. A brake booster as claimed in claim 20, further comprising a flexible helical tube which is disposed in said first chamber of the housing to receive therein lead wires extending from said pressure sensor, the leading end of said helical tube being projected outwardly from said housing.

* * * * *